(12) United States Patent
Nagaraja et al.

(10) Patent No.: US 11,283,490 B2
(45) Date of Patent: Mar. 22, 2022

(54) CONDITIONAL REFERENCE SIGNAL TRANSMISSION AND MEASUREMENT

(71) Applicant: QUALCOMM Incorporated, San Diego, CA (US)

(72) Inventors: Sumeeth Nagaraja, San Diego, CA (US); Tao Luo, San Diego, CA (US); Kaushik Chakraborty, San Diego, CA (US); Sony Akkarakaran, Poway, CA (US); Makesh Pravin John Wilson, San Diego, CA (US); Shengbo Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/431,491

(22) Filed: Jun. 4, 2019

(65) Prior Publication Data

US 2019/0288750 A1 Sep. 19, 2019

Related U.S. Application Data

(62) Division of application No. 15/946,085, filed on Apr. 5, 2018.

(Continued)

(51) Int. Cl.
*H04B 7/0417* (2017.01)
*H04W 52/02* (2009.01)
*H04W 56/00* (2009.01)

(52) U.S. Cl.
CPC ...... *H04B 7/0417* (2013.01); *H04W 52/0229* (2013.01); *H04W 56/0065* (2013.01); *H04W 56/0095* (2013.01)

(58) Field of Classification Search
CPC ............ H04B 7/0417; H04W 56/0065; H04W 56/0095; H04W 52/0229
See application file for complete search history.

(56) References Cited

U.S. PATENT DOCUMENTS

2012/0113950 A1\* 5/2012 Skov ..................... H04L 5/0016
370/329
2015/0189613 A1 7/2015 Chen et al.
(Continued)

FOREIGN PATENT DOCUMENTS

| CN | 102835084 A | 12/2012 |
| CN | 105580297 A | 5/2016 |
| WO | 2013166932 A1 | 11/2013 |

OTHER PUBLICATIONS

Ericsson: "RLM and RLF in NR", 3GPP Draft; R2-1704089—RLM and RLF in NR, 3rd Generation Partnership Project (3GPP), Mobile Competence Centre ; 650, Route Des Lucioles; F-06921 Sophia-Antipolis Cedex ; France, vol. RAN WG2, No. Spokane, USA; Apr. 3, 2017-Apr. 7, 2017 May 14, 2017 (May 14, 2017), XP051274698, 3 pages, Retrieved from the Internet: URL: http://www.3gpp.org/ftpjMeetings_3GPP_SYNC/RAN2/Docs/, [retrieved on May 14, 2017].

(Continued)

*Primary Examiner* — Kabir A Timory
(74) *Attorney, Agent, or Firm* — Arent Fox, LLP

(57) ABSTRACT

A user equipment apparatus determines whether a transmission is received from a base station within a time window and skips measurement of a reference signal during a subsequent period, when a transmission is received from the base station within the time window. A base station apparatus configures a UE to monitor one or more reference signals associated with a beam pair link and transmits a first signal in a transmission to the UE. The base station determines whether the transmission is received at the UE within (Continued)

a time window and determines whether to transmit a reference signal, based on whether the transmission is received at the UE within the time window. Upon determining that the transmission was received at the UE, the base station may skip transmission of the reference signal or modify a time, a frequency, a power, and/or a reference signal offset for the reference signal.

18 Claims, 14 Drawing Sheets

Related U.S. Application Data

(60) Provisional application No. 62/513,843, filed on Jun. 1, 2017.

(56) References Cited

U.S. PATENT DOCUMENTS

| | | | |
|---|---|---|---|
| 2016/0100404 A1* | 4/2016 | Han | H04L 5/00 370/329 |
| 2016/0233995 A1 | 8/2016 | Wang et al. | |
| 2016/0241434 A1 | 8/2016 | Li et al. | |
| 2016/0269967 A1* | 9/2016 | Suzuki | H04W 36/36 |
| 2016/0301509 A1 | 10/2016 | Narasimha et al. | |
| 2017/0055271 A1* | 2/2017 | Lee | H04W 72/082 |
| 2017/0141894 A1 | 5/2017 | Wei et al. | |
| 2017/0195031 A1 | 7/2017 | Onggosanusi et al. | |
| 2017/0231011 A1 | 8/2017 | Park et al. | |
| 2017/0231021 A1 | 8/2017 | Tavildar et al. | |
| 2017/0245165 A1 | 8/2017 | Onggosanusi et al. | |
| 2018/0351611 A1 | 12/2018 | Nagaraja et al. | |

OTHER PUBLICATIONS

International Search Report and Written Opinion—PCT/US2018/026569—ISA/EPO—dated Sep. 21, 2018.
Mediatek Inc: "Cell Selection and Reselection in NR", 3GPP Draft; R2-1704530 Cell Selection and Reselection in NR, 3rd Generation Partnership Project (3GPP), Mobile Competence Centre; 650, Route Des Lucioles ; F-06921 Sophia-Antipolis Cedex; France, vol. RAN WG2, No. Hangzhou, China; May 15, 2017-May 19, 2017,May 14, 2017 (May 14, 2017), XP051275089, 2 pages, Retrieved from the Internet: URL: http://www.3gpp.org/ftp/Meetings_3GPP_SYNC/RAN2/Docs/, [retrieved on May 14, 2017].
Partial International Search Report—PCT/US2018/026569—ISA/EPO—dated Jul. 27, 2018.
ZTE: "SCell Radio Link Monitoring", 3GPP Draft; R2-106327 SCell RLM, 3rd Generation Partnership Project (3GPP), Mobile Competence Centre; 650, Route Des Lucioles; F-06921 Sophia-Antipolis Cedex; FRANCE, vol. RAN WG2, No. Jacksonville, USA; Nov. 15, 2010, Nov. 9, 2010 (Nov. 9, 2010), XP050492227, 2 pages, [retrieved on Nov. 9, 2010].
Taiwan Search Report—TW107112064—TIPO—dated Jul. 15, 2021.
Taiwan Search Report—TW107112064—TIPO—dated Dec. 27, 2021.

* cited by examiner

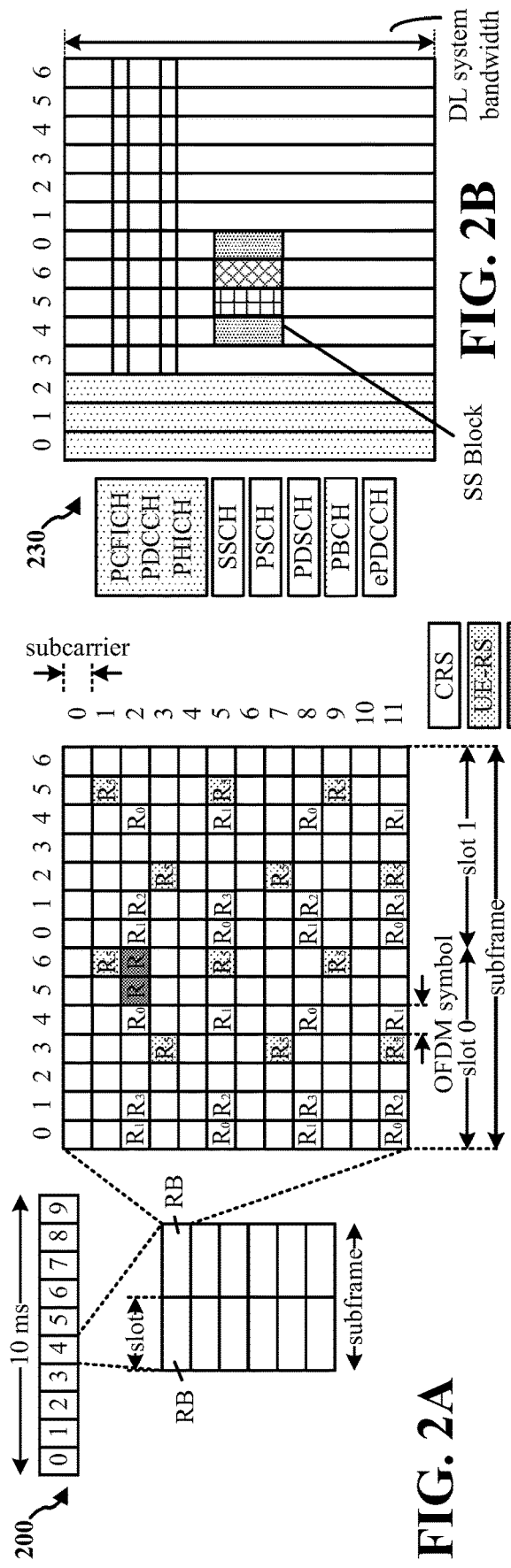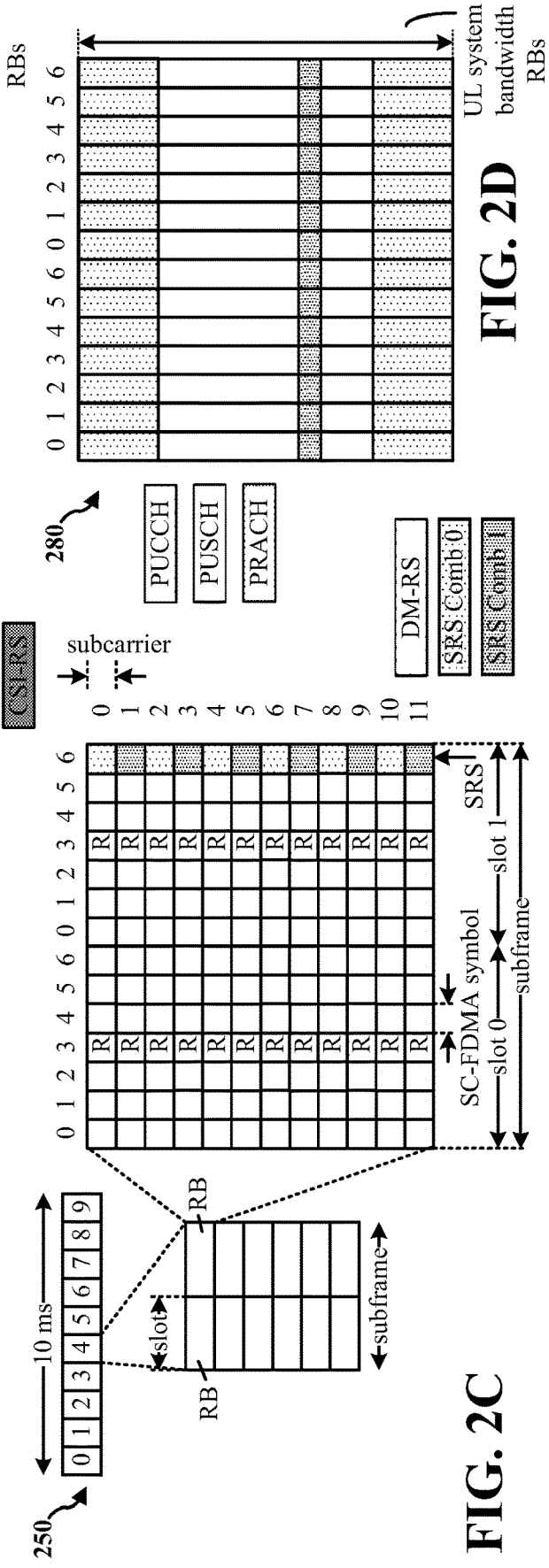

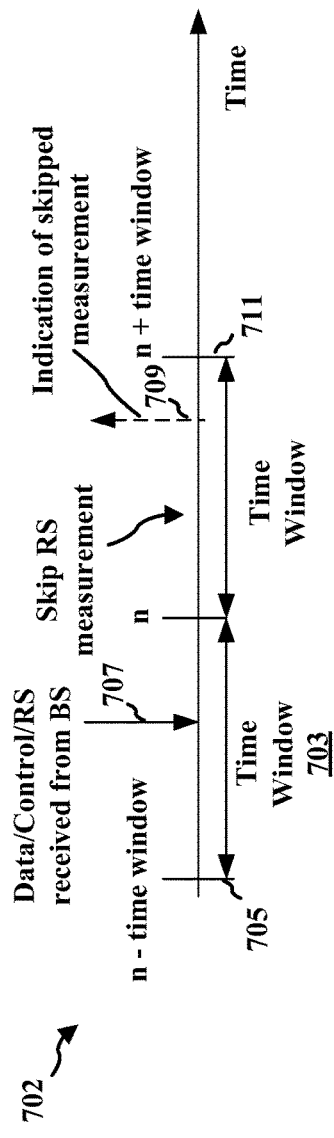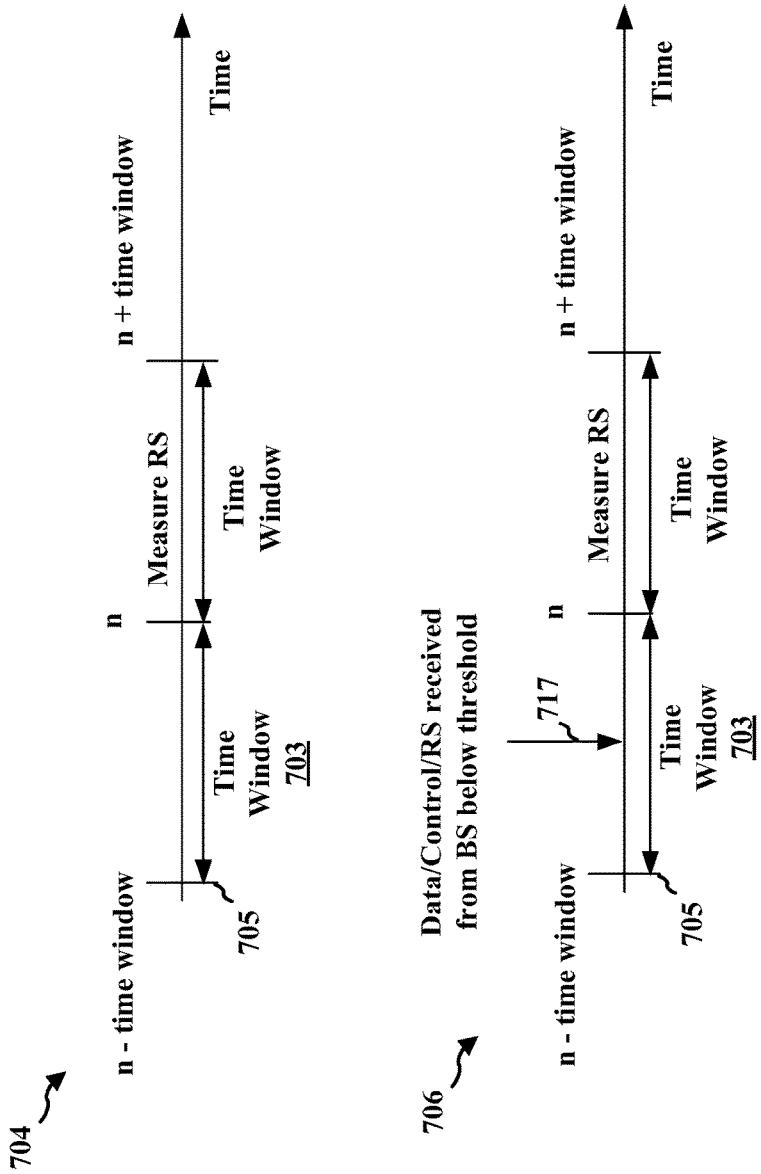
FIG. 7A
FIG. 7B
FIG. 7C

CONDITIONAL REFERENCE SIGNAL TRANSMISSION AND MEASUREMENT

CROSS-REFERENCE TO RELATED APPLICATION

This application is a Divisional of U.S. patent application Ser. No. 15/946,085, entitled "Conditional Reference Signal Transmission and Measurement" and filed on Apr. 5, 2018, which claims the benefit of U.S. Provisional Application Ser. No. 62/513,843, entitled "Conditional Reference Signal Transmission and Measurement" and filed on Jun. 1, 2017, which are expressly incorporated by reference herein in their entirety.

BACKGROUND

Field

The present disclosure relates generally to communication systems, and more particularly, to reference signal transmissions and measurements in multi-beam wireless communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G/NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G/NR may be based on the 4G Long Term Evolution (LTE) standard. There exists a need for further improvements in 5G/NR technology. These improvements may also be applicable to other multi-access technologies and the telecommunication standards that employ these technologies.

Radio Link Monitoring (RLM) may be an important procedure to track radio link conditions. The RLM procedure may indicate whether the air link is in-sync or out-of-sync. For monitoring active link performances, a User Equipment (UE) needs to perform measurements of a set of reference signals for RLM and beam recovery. The measurements may include deriving a metric similar to Signal to Interference plus Noise Ratio (SINR) for a reference signal. There are a number of challenges associated with radio link monitoring in multi-beam wireless communication systems, e.g., mmW communication, sub-6 wireless communication, or other multi-beam operation.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

There are a number of challenges associated with radio link monitoring in multi-beam wireless communication systems. In order to perform RLM, the UE needs to measure the quality of a reference signal. However, there might not be a direct reference signal that is always transmitted, e.g., such as CRS, which can be monitored in relation to New Radio-Physical Downlink Control Channel (NR-PDCCH). Additionally, the transmission of downlink (DL) and/or uplink (UL) communication with the UE may be sporadic. Therefore, the UE may not have a persistent observation of DL control channel performance. A UE might not know whether a base station is transmitting a DL control channel transmission, e.g., Physical Downlink Control Channel (PDCCH) or NR-PDCCH, and therefore, faces difficulties in deriving PDCCH reliability.

While a base station could transmit PDCCH or Demodulation Reference Signal (DMRS) for PDCCH periodically to improve monitoring PDCCH reliability for RLM, this increased PDCCH requirement would cause unnecessary overhead and increased use of wireless resources. For example, in multi-beam operation, a reference signal transmitted by a base station in a particular beam can only be received by a small subset of users. Therefore, the base station would be required to transmit a periodic PDCCH, or other reference signals, for each of multiple beam directions.

The present application provides a solution that enables a UE in multi-beam operation to perform RLM while reducing the burden of reference signal transmission at the base station by enabling conditional reference signal transmission and/or conditional RLM and beam recovery.

In an aspect of the disclosure, a method, a computer-readable medium, and an apparatus are provided for multi-beam operation at a base station. The apparatus determines whether a transmission is received at a UE within a time window and determines whether to transmit a reference signal, based on whether the transmission is received at the UE within the time window. The base station may determine that the transmission is received at the UE upon receiving at least one of a control channel, a data channel, a sounding reference signal, and an acknowledgement from the UE having a signal quality that meets a threshold within the time window. Upon determining that the transmission was received at the UE, the apparatus may skip transmission of the reference signal or modify at least one of a time, a frequency, a power, or a reference signal offset for the reference signal.

In another aspect of the disclosure, a method, a computer-readable medium, and an apparatus are provided for multi-beam operation at a UE. The apparatus determines whether a transmission is received from the base station within a time window, and skips measurement of a reference signal when the transmission is received from the base station within the time window. The measurement of the reference signal may be based on a reference signal configuration, which may include an indication of any of a time window, a reference signal based offset, or a signal quality threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

FIGS. 7A, 7B, and 7C illustrate aspects of conditional reference signal measurement.

DETAILED DESCRIPTION

Figure 1:
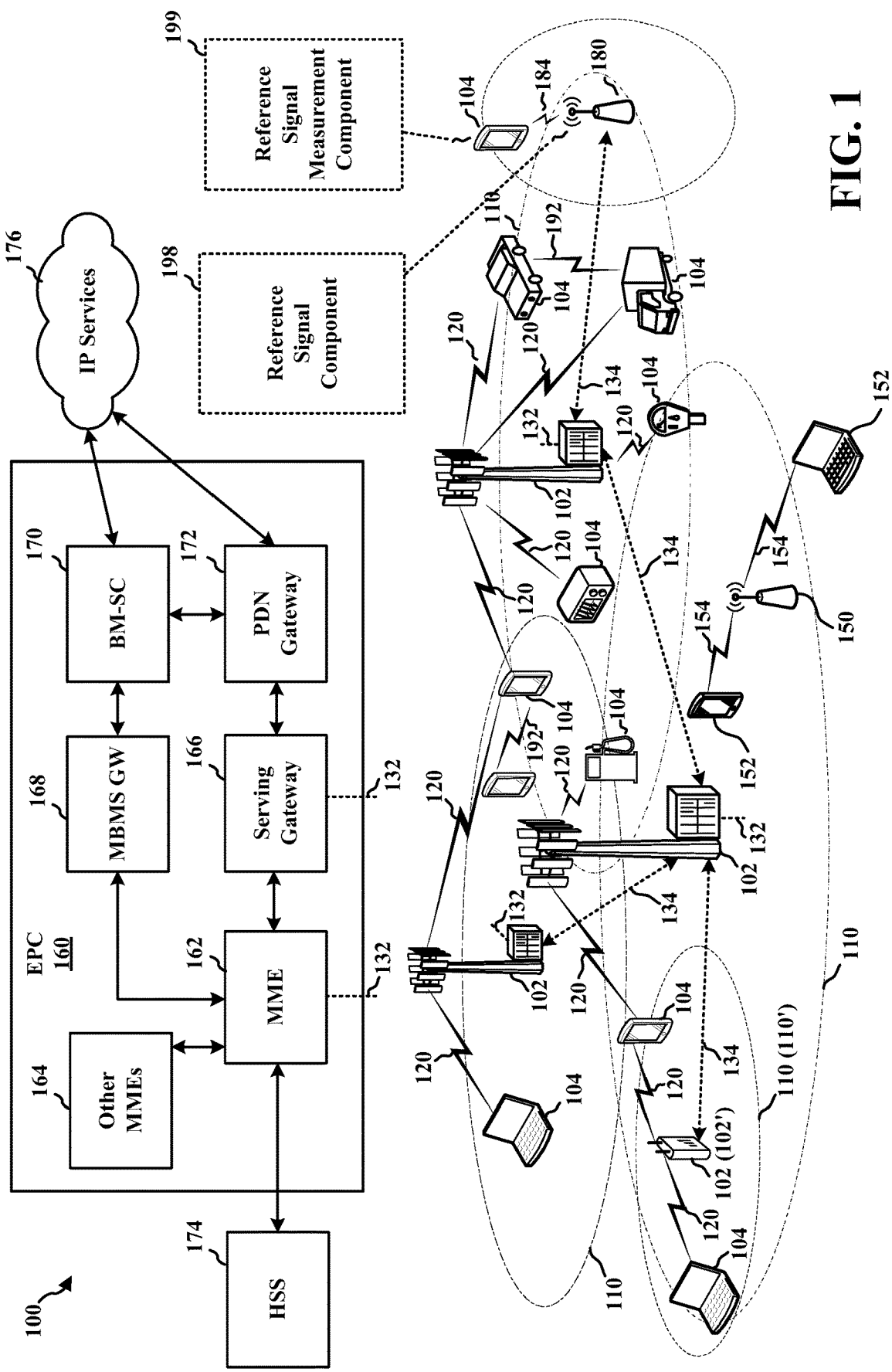
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or 5G/NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ 5G/NR and use the same 5 GHz unlicensed frequency spectrum as used by the Wi-Fi AP 150. The small cell 102', employing 5G/NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may comprise a reference signal component 198 configured for conditional reference signal transmission, as described in connection with any of FIGS. 5-7B and 12-14, including skipping transmission of reference signals when certain conditions are met. Similarly, the UE 104 may comprise a reference signal measurement component 199 configured to perform conditional reference signal measurement, as described in connection with any of FIGS. 5-11, including skipping measurement of a reference signal when certain conditions are met.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the PDCCH occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DMRS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
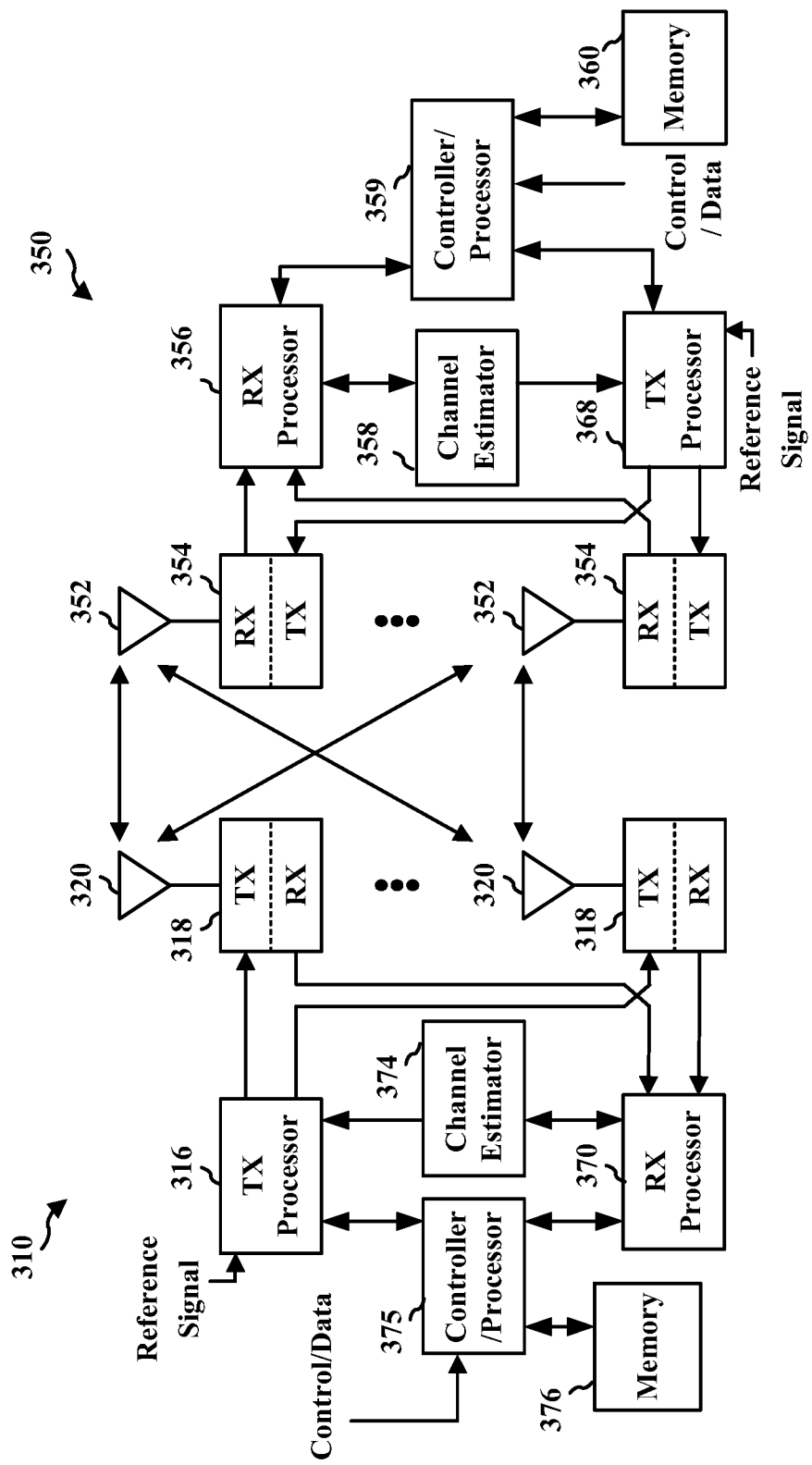
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
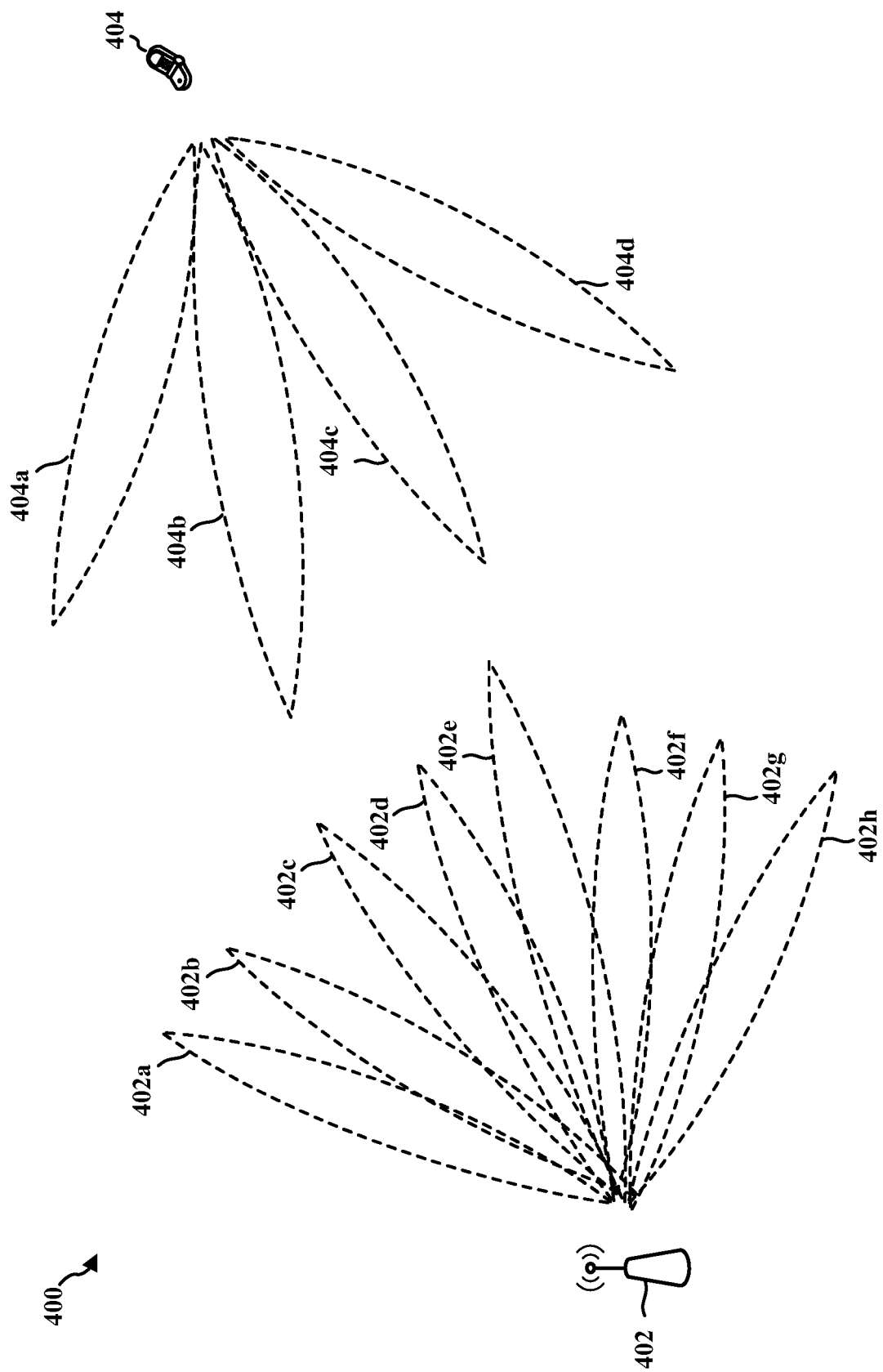
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Radio Link Monitoring (RLM) may be an important procedure to track radio link conditions. The RLM procedure may indicate whether the air link is in-sync or out-of-sync. For monitoring active link performances, a UE may perform measurements of a set of reference signals for RLM and beam recovery. The measurements may include deriving a metric similar to Signal to Interference plus Noise Ratio (SINR) for a reference signal. The reference signal may comprise any of CSI-RS, Demodulation Reference Signal (DMRS) for NR-PDCCH in common search space (C-SS), DMRS for New Radio-Physical Broadcast Channel (NR-PBCH), New Radio-Secondary Synchronization Signal (NR-SSS), other reference signals for time and/or frequency tracking, etc. The UE may monitor the reference signal(s) and determine the signal quality, e.g., Reference Signal Received Power (RSRP) for the reference signal. The measurement may correspond to the UE's ability to decode a transmission, e.g., a DL control transmission from the base station.

Thresholds may be defined in tracking the radio link conditions, the threshold(s) may correspond to a block error rate that indicates an in-sync condition and/or an out-of-sync condition of the radio link.

An RLM procedure may comprise two types of indications, e.g., "out-of-sync" indicating that the radio link condition is poor and "in-sync" indicating that the radio link condition is acceptable and the UE is likely to receive a transmission transmitted on the radio link. An Out-of-Sync condition may be declared when a block error rate for the radio link falls below a threshold over a specified time interval, e.g., a 200 ms time interval. An in-sync condition may be declared when a block error rate for the radio link is better than a threshold over a second, specified time interval, e.g., over 100 ms time interval. The thresholds and time intervals for the in-sync and out-of-sync determinations may be the same or may be different.

If the UE receives a number n of consecutive out-of-sync measurements over a period of time, the UE may declare a radio link failure (RLF).

Based on input from RLM or beam recovery when an RLF is detected, a UE may take appropriate actions to recover the connection. Radio link failure may be based on in-sync or out-of-sync indications as an input from lower layers. The radio link quality may be associated with the reliability of a DL control channel. For example, in 5G/NR, the radio link quality may be associated with 5G/NR-PDCCH. In LTE, radio link quality may also relate to DL control channel performance, e.g., PDCCH.

There are a number of challenges associated with radio link monitoring in multi-beam wireless communication systems, e.g., as described in connection with FIG. 4. Examples of such multi-beam communication may include mmW communication, sub-6 wireless communication, etc.

In order to perform RLM, the UE needs to measure the quality of a reference signal. However, there might not be a direct reference signal that is always transmitted, e.g., such as CRS, which can be monitored in relation to NR-PDCCH. As there might not be a direct reference signal that is consistently transmitted, it may be difficult for a UE to perform the needed measurements.

Additionally, the transmission of DL and/or UL communication with the UE may be sporadic. Therefore, the UE may not have a persistent observation of DL control channel performance. A UE might not know whether a base station is transmitting a DL control channel transmission, e.g., PDCCH or NR-PDCCH. Therefore, the UE faces difficulties in deriving PDCCH reliability. Acknowledgements (Acks) may be sent on a DL for Semi-Persistent Scheduling (SPS) uplink traffic and may be pre-configured to occur at fixed time intervals. Acks for other UL transmissions such as SRS, beam-failure indication or SR may also be acquired by the UE. In this example, even if the definite time of an Ack transmission is not known, when no Ack is received in a time window, the UE knows that there was a missed PDCCH carrying the Ack. While a base station could transmit PDCCH or DMRS for PDCCH periodically just for the purpose of monitoring PDCCH reliability for RLM, this increased PDCCH requirement causes unnecessary overhead and use of wireless resources. For example, in multi-beam operation, a reference signal transmitted by a base station in a particular beam can only be received by a small subset of users. If the base station is required to transmit a periodic PDCCH, or other reference signal, transmission for RLM, the base station would be required to make the periodic transmissions for each of multiple beam directions. The transmissions in multiple beam directions increases the overhead burden and use of wireless resources.

The present application provides a solution that enables a UE in multi-beam operation to perform RLM, beam recovery and beam management in a manner that reduces the burden of reference signal transmission at the base station by enabling conditional reference signal transmission and/or conditional RLM and beam recovery. A reference signal transmission and measurement for RLM or beam recovery may be skipped or modified when certain conditions are met. For example, a base station may skip, or otherwise modify, a RS transmission over a period when data/control/RS is received from the UE within a window of time. The reception of the data/control/RS from the UE may indicate to the base station that the UE received the previous reference signal transmission from the base station. A UE may skip a measurement of a reference signal when the UE has received control/data/RS from the base station within a window of time.

Figure 5:
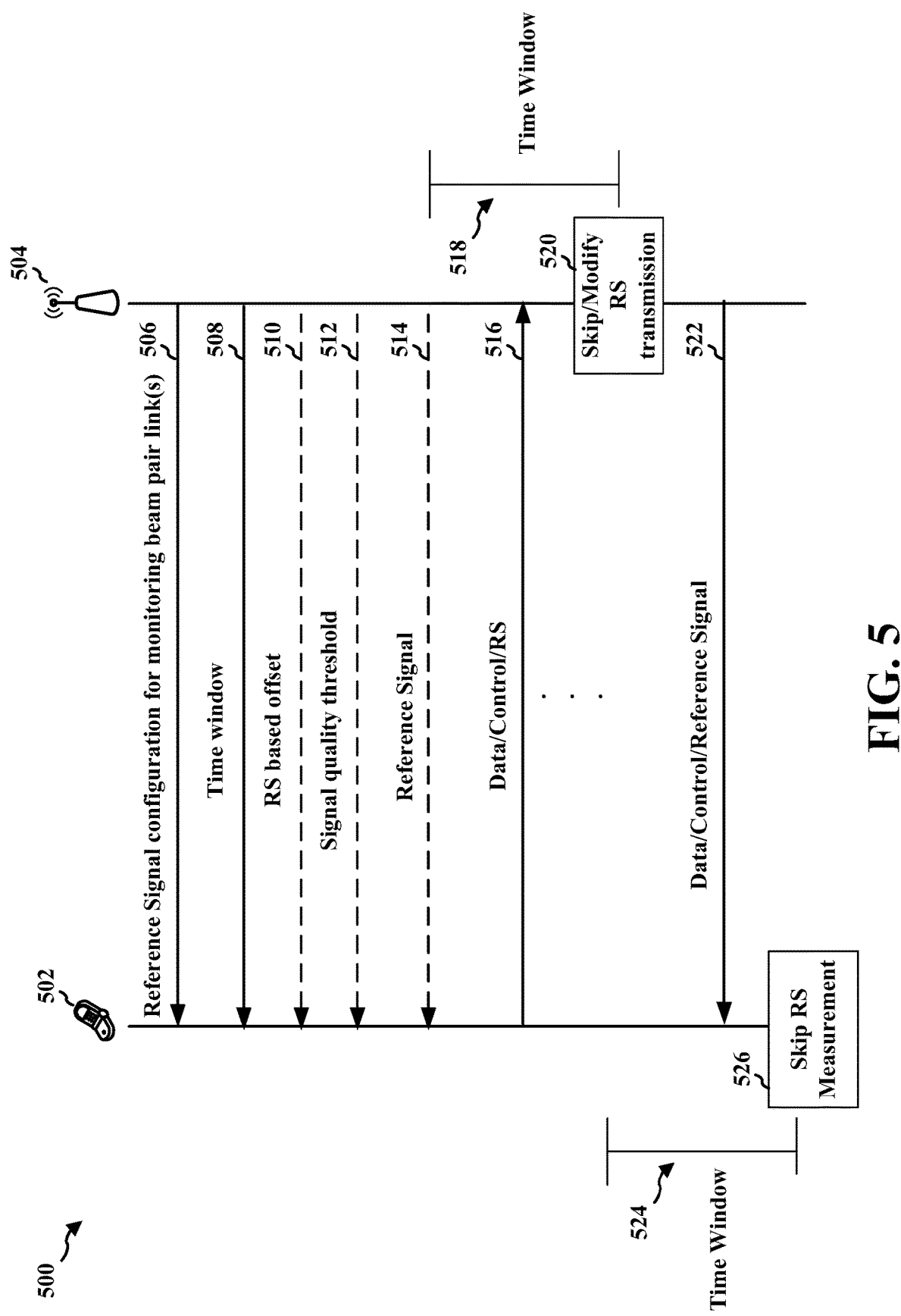
FIG. 5 is a diagram illustrating conditional reference signal transmission and measurement.

FIG. 5 illustrates an example of multi-beam wireless communication 500 between a UE 502 and a base station 504. UE 502 may correspond to UE 104, 350, 404, 1350, the apparatus 1002, 1002', and base station 504 may correspond to base station 180, 310, 402, 1050, the apparatus 1302, 1302'. As illustrated in FIG. 5, the base station 504 may skip or modify a reference signal transmission when certain conditions are met and/or the UE 502 may skip measuring a reference signal when certain conditions are met.

The base station 504 may provide reference signal configuration information 506 to UE 502 for monitoring one or more beam pair links. For example, the base station 504 may notify UE 502 to monitor one or more reference signals. The reference signals may include, e.g., any of CSI-RS, DMRS for NR-PDCCH in C-SS, DMRS for NR-PBCH in user search space (U-SS), NR-SSS, and a reference signal for time/frequency tracking. The reference signals may comprise periodic, aperiodic or semi-persistent transmissions. The reference signal configuration information 506 indicated by the base station 504 may specify any of a number of antenna ports, a reference signal configuration in time and frequency, and/or a sub-frame configuration. A subset of reference signal configurations may be reserved by the base station for RLM.

The base station 504 may transmit reference signals, e.g., 514, 522 to UE 502. The base station may skip or modify reference signal transmissions when certain conditions are met. For example, when the base station 504 has received a transmission 516, e.g., a data transmission, a control transmission, or a reference signal transmission, from the UE 502 within a time window 518, and the received transmission has an SNR or signal quality above a threshold, the base station may skip or modify 520 a transmission of a reference signal. The skipped reference signal may be, e.g., for RLM, beam recovery, beam management, etc. The data/control/RS transmission 516 received from the UE 502 may comprise any of PUCCH, PUSCH, SRS, DMRS, ACK/NACK, etc. The receipt of PUCCH, PUSCH, DMRS, SRS, or ACK/NACK from the UE may indicate to the base station that the UE received a previous reference signal transmission.

Figure 6A:
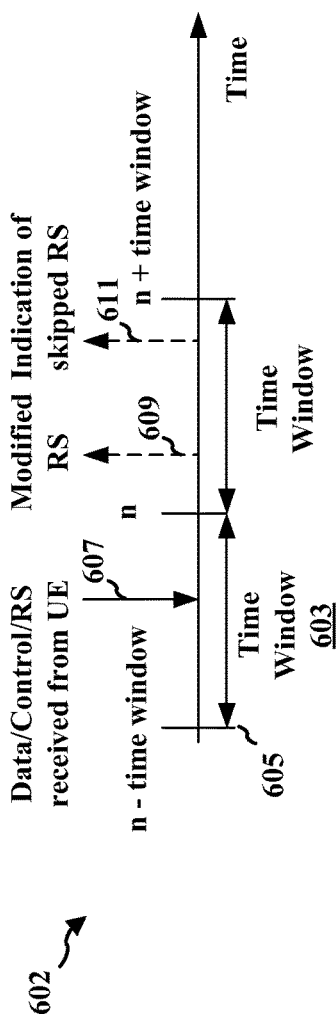
FIGS. 6A, 6B, and 6C illustrate aspects of conditional reference signal transmission.

FIG. 6A illustrates an example 602 having n as a current point in time, e.g., a current symbol. The base station may use a time window 603 to determine whether a data/control/reference signal transmission has been received from a UE within the period from n to n−time window 605, e.g., within the time window from the current point n. For example, n may represent a symbol, e.g., a current symbol. In FIG. 6A, a data transmission, a control transmission, or a reference signal transmission 607 was received from the UE within the time window, e.g., between n and n−time window. If the signal quality of the received transmission 607 meets a threshold, the base station may determine to skip or modify a reference signal transmission during a period extending from the current symbol, e.g., n, to n+time window. Thus, the base station may transmit a modified RS 609 in the period from n to n+time window based on the receipt of data/control/RS 607 from the UE. FIGS. 7A, 7B, and 7C illustrate a similar time window that may be used by a UE. The time windows may be configured differently by the base station.

Figure 6B:
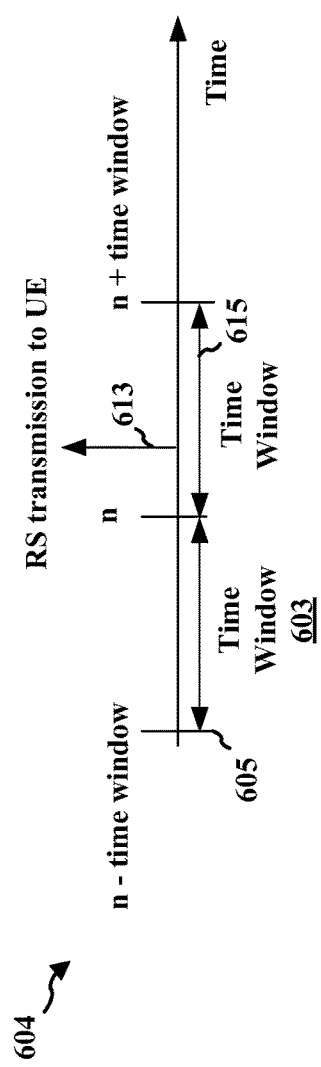

If the base station 504 has not received a data/control/reference signal transmission from the UE 502 within the time window 603, e.g., n−time window, then the base station may transmit the reference signal 613, e.g., for RLM, beam recovery, beam management, in the current symbol or over the next period 615, e.g., n+time window. FIG. 6B illustrates an example 604 I which no data transmission, control transmission, or reference signal transmission was received from the UE within the time window 603, e.g., between n and n−time window. In this example, the condition is not met, and the base station transmits the reference signal 613 within the period between the current point n and n+time window.

Figure 6C:
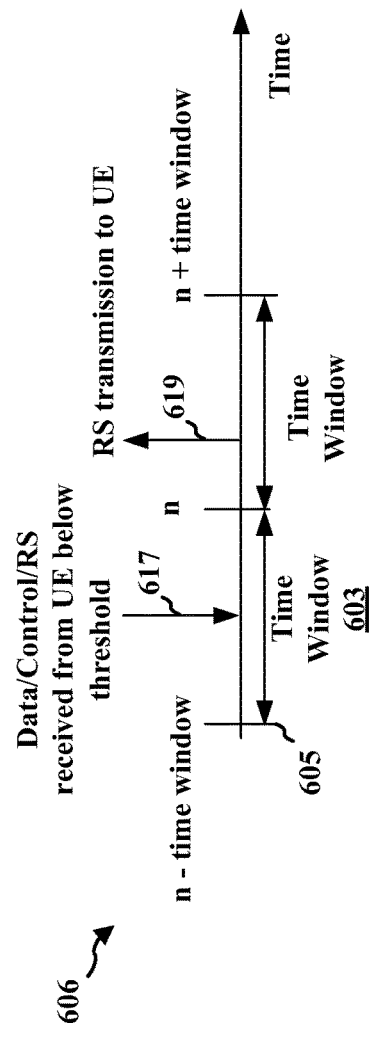

The transmission received from the UE, e.g., 607, may need to satisfy a signal quality threshold for the base station to skip or modify the reference signal transmission. For example, if the network has received a data/control/reference signal transmission from the UE within a time window, but the network determines that the SNR or signal quality of the received data/control/reference signal transmission is below a threshold, the base station may transmit the reference signal in the current symbol or over the next period n+time window, n being the current point in time. The reference signal may be transmitted for RLM, beam recovery, beam management, etc. Thus, the base station may determine not to skip or modify the reference signal transmission even though a transmission was received from the UE within the time window, when the received transmission has a signal quality or SNR below a threshold. FIG. 6C illustrates an example 606 where the base station receives a transmission 617 from the UE having a signal quality below the threshold. In this example, the base station transmits the RS 619, similar to FIG. 6B.

When a condition is met, e.g., the base station has received a data/control/RS transmission from the UE that meets a signal quality threshold within the time window, the base station may skip a reference signal transmission during a certain period. For example, the base station may skip transmission of the reference signal during a period of time from the current point in time corresponding to the time window, e.g., n+time window.

In a second example, the base station may still transmit the reference signal, but may modify the reference signal transmission, e.g., as illustrated in FIG. 6A. For example, the base station may modify the timing of the reference signal, a frequency of the reference signal, and/or a transmission power for the reference signal. The base station may modify the reference signal for a subset of users.

In a third example, the base station may schedule other UEs instead of transmitting the reference signal transmission. For example, a different UE may be scheduled for data transmission instead of transmitting the reference signal.

When the base station determines to skip the reference signal transmission, e.g., as in the first and third examples, the base station may indicate 611 to the UE 502 that the reference signal is skipped, e.g., as illustrated in the example of FIG. 6A. The indication may be comprised in PDCCH or PDSCH, for example. Without such an indication, the UE may expect the reference signal transmission and may interpret the absence of the reference signal as a measurement of poor signal quality.

Similar to the conditional transmission of a reference signal performed by the base station, the UE may perform conditional measurement of a reference signal. For example, as illustrated in FIG. 5, when the UE has received a transmission, e.g., a data transmission, a control transmission, or a reference signal transmission 522, having an SNR or signal quality above a threshold within a time window 524, the UE may skip 526 measurement of a reference signal. The skipped reference signal may be, e.g., for RLM, beam recovery, beam management, etc. The data/control/RS transmission received from the base station may comprise any of PDCCH, PDSCH, RS, etc.

The base station may provide or otherwise indicate a time window 508 to UE 502. The size of the time window may be indicated to the UE in terms of slots, symbols, SFN, etc. The time window for the UE, e.g., as described in connection with FIGS. 7A, 7B, and 7C, may be the same or may be different than the time window used by the base station, e.g., as described in connection with FIGS. 6A, 6B, 6C. As illustrated in FIG. 5, the base station may also indicate a reference signal based offset 510 and/or a signal quality threshold 512 to the UE 502. Although the time window 508, the reference signal based offset 510, and the signal quality threshold 512 are illustrated as three separate transmissions, this information may also be indicated to the UE 502 in a single transmission from the base station 504.

FIG. 7A illustrates an example 702 having n as a current point in time, e.g., a current symbol. The UE may use a time window to determine whether a data/control/reference signal transmission has been received from a base station within the period from n to point 705, e.g., n−time window, e.g., within the time window 703 from the current point n. For example, n may represent a symbol, e.g., a current symbol. In FIG. 7A, a data transmission, a control transmission, or a reference signal transmission 707 has been received from the base station within the time window 703, e.g., between n and n−time window. If the signal quality of the received transmission meets a threshold, the UE may determine to skip or measurement of a reference signal during a period following n, e.g., during a period in time extending from the current symbol to point 711, e.g., n to n+time window. The threshold may be based on the signal quality threshold 512 signaled to the UE 502 from the base station 504.

When a condition is met, e.g., when the UE has received a data/control/RS transmission from the base station within a prior time window that meets a signal quality threshold, the UE may go to sleep or remain in sleep during a subsequent time window, in a first example. For example, the UE need not wake up during the period n to n+time window to perform RS measurements.

In a second example, the UE may use a reference signal based offset to map a signal quality from one reference signal to another reference signal, e.g., to the skipped reference signal. The reference signals may be different types. Therefore, the UE may derive a signal quality or performance metric for a first type of reference signal using a measured signal quality for a different type of reference signal based on the reference signal based offset. For example, if the skipped reference signal comprises a CSI-RS, the UE may use the reference signal based offset to map a signal quality from a measured DMRS to infer the quality of the hypothetical CSI-RS that was skipped. The reference signal based offset may be the one signaled to the UE, e.g., at 510.

In a third example, the UE may send an in-sync or out-of-sync indication to higher layers based on the reference signal measurements during the prior time period, e.g., the period from n to n−time window. The measurements might be measurements for other reference signals than those typically used for RLM. Therefore, the in-sync or out-of-sync indications may also be based on the reference signal based offset as applied to the different reference signals, as described in connection with the second example.

In a fourth example, the UE may indicate 709 to the base station, e.g., via PUCCH or PUSCH, that the reference signal measurement will be skipped over a time window.

If the UE 502 has not received a data/control/reference signal transmission from the base station 504 within the time window, e.g., between n to n−time window, then the UE may perform a measurement of the reference signal, e.g., for RLM, beam recovery, beam management, in the current symbol or over the next period n+time window. FIG. 7B illustrates an example 704 in which no data transmission, control transmission, or reference signal transmission has been received during time period 703. Therefore, the condition is not met, and the UE measures the reference signal within the subsequent time period, e.g., during the time between the current point n and n+time window.

FIG. 7C illustrates an example 706 where the UE receives a transmission 717 from the base station, but the transmission 717 has a signal quality that does not meet the threshold. In this example, the UE measures the reference signal during the subsequent time period following n, e.g., during the period n to n+time window, similar to FIG. 7B.

If the UE performs reference signal measurements and determines that the signal quality of reference signal has changed significantly, or is DTX, then the UE may determine not to use the measurement for an in-sync/out-of-sync indication. A significant change in the measured signal quality may indicate that the base station has skipped the RS transmission during this period, because consecutive reference signal transmissions should have similar signal qualities. By refraining from using the measurement for in-sync/out-of-sync indications, the UE avoids using an inaccurate measurement for the in-sync/out-of-sync indication. The UE may determine whether a change in reference signal measurements is significant by comparing the difference between the measurements to a change threshold. The change threshold may be configurable by the network. The change threshold may depend on time and/or frequency differences between the measurements. In one example for mmW communication, two reference signal measurements approximately 10 ms apart should have a signal quality measurement within about 2 dB of each other. Therefore, the change threshold may be approximately 5 dB, which would indicate a significant change between the two reference signal measurements.

Figure 8:
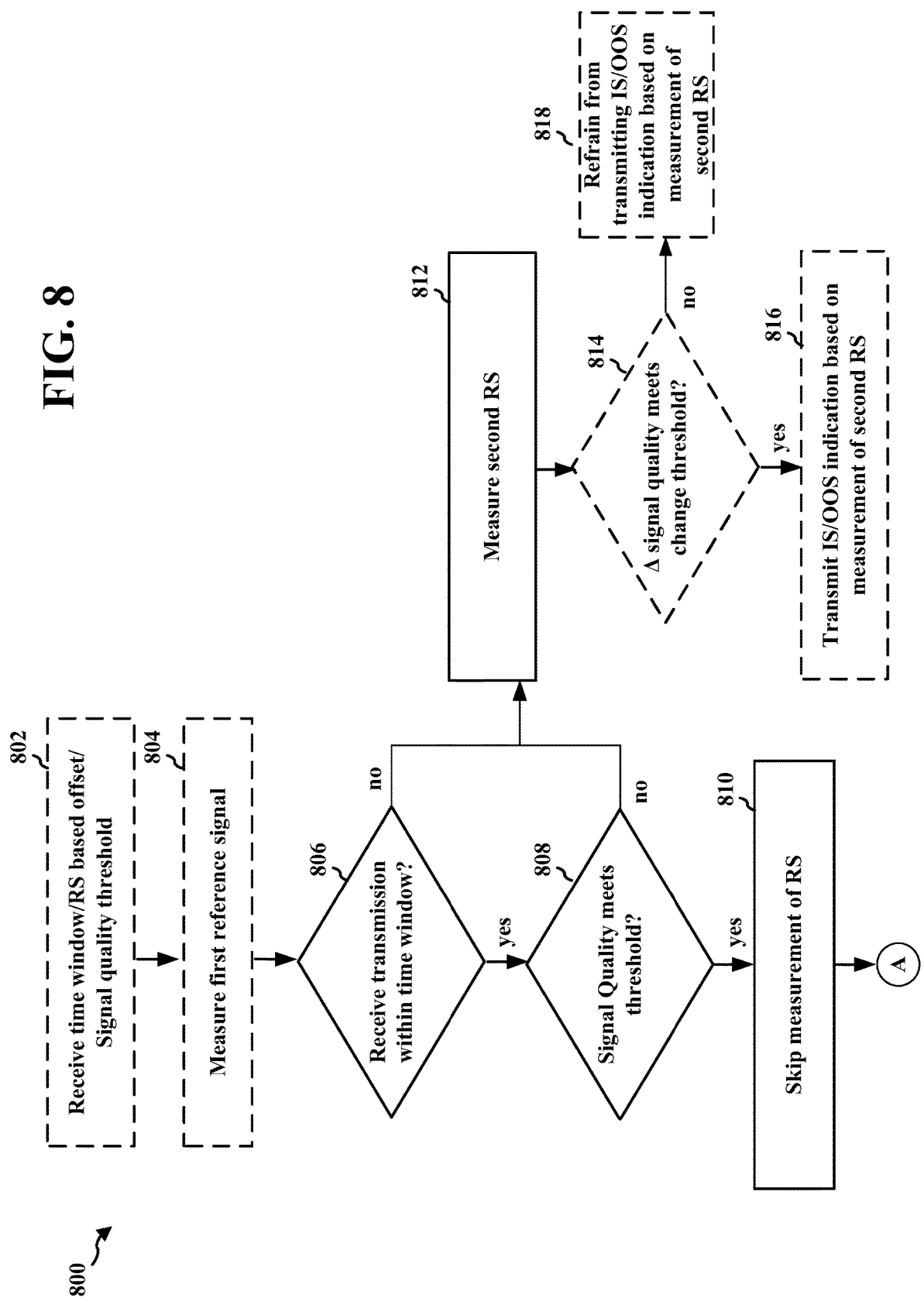
FIG. 8 is a flowchart of a method of wireless communication.

FIG. 8 is a flowchart 800 of a method of wireless communication. The method may be performed by a UE (e.g., UE 104, 350, 404, 502, 1350, the apparatus 1002, 1002') communicating with a base station (e.g., the base station 180, 310, 402, 504, 1050, the apparatus 1302, 1302') using multi-beam wireless communication. Optional aspects of FIG. 8 are illustrated with a dashed line.

At 806, the UE determines whether a transmission is received from the base station within a time window, e.g., within a time window prior to the current time. FIGS. 7A, 7B, and 7C illustrate an example time window 703 prior to a current symbol n and extending to n−time window. A transmission received from the base station may comprise at least one of a data transmission, a control transmission, and/or a reference signal transmission. In one example, the transmission may be any measurable transmission from the base station. The transmission may comprise data, control, or a reference signal. A reference signal may comprise a reference signal associated with a beam link pair. The UE may receive a notification from the base station to monitor one or more reference signals and may receive a reference signal configuration for monitoring, e.g., as described in connection with 506 in FIG. 5. The UE may receive, e.g., at 802, an indication from the base station for at least one of the time window, a reference signal based offset to the user equipment, and a signal quality threshold, e.g., as described in connection with 508, 510, 512 in FIG. 5. Therefore, the time window that the UE uses in 806 may be based on the indication received from the base station at 802.

The UE may determine at 808 whether a signal quality of the transmission received from the base station meets a threshold.

When the transmission is not received from the base station within the time window or when the signal quality of the transmission does not meet the threshold, the user equipment may measure a reference signal at 812, e.g. as described in connection with FIGS. 7B and 7C. The UE may refrain from measuring the reference signal during a period following the determination. As described in connection with FIGS. 7A, 7B, and 7C, the UE may skip measurement of the reference signal during a subsequent time window, e.g., during a time period from n to n+time window.

At 810, the UE skips measurement of the reference signal, when the transmission is received from the base station within the time window and meets the signal quality threshold, e.g., as described in connection with FIG. 7A.

Figure 9:
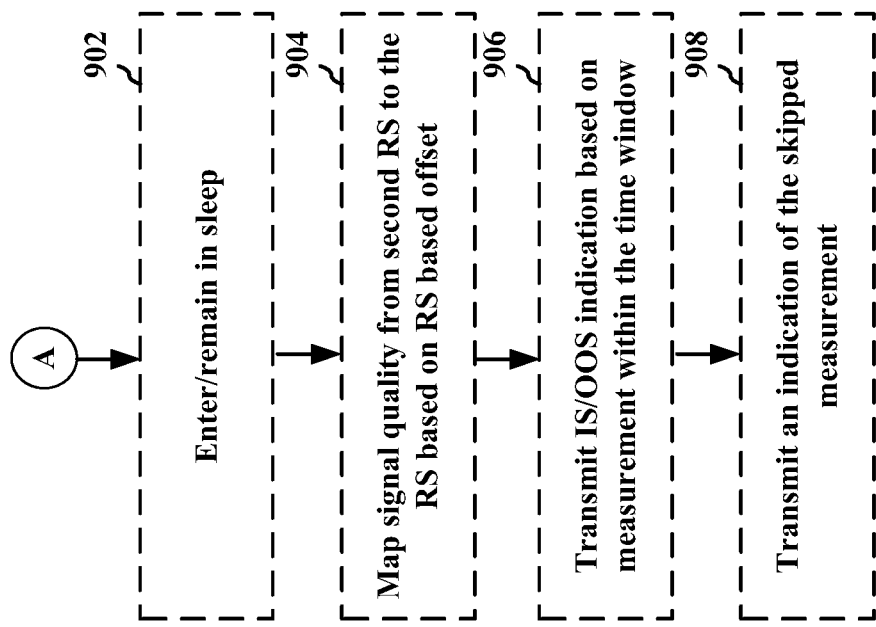
FIG. 9 is a flowchart of a method of wireless communication.

As illustrated in FIG. 9, skipping measurement of the reference signal at 810 may include entering a sleep mode or remaining in a sleep mode 902.

The UE may further map a signal quality from a different reference signal to the reference signal based on a reference signal based offset at 904. The two reference signals may be different type of reference signals. At 906, UE may transmit an in-synchronization indication or an out-of-synchronization indication based on a measurement within the time window.

At 908, the UE may transmit an indication to the base station of the skipped measurement of the reference signal, e.g., as described in connection with indication 709 in FIG. 7A. The indication may be transmitted in PUCCH or PUSCH.

As illustrated at 804, the UE may perform a measurement of a prior reference signal from a base station. At 814, the UE may determine whether a difference between a first signal quality of the reference signal and a second signal quality of the prior reference signal meets a change threshold. At 816, the UE may transmit an in-synchronization indication or an out-of-synchronization indication based on the reference signal when the difference is within the change threshold. At 818, the UE may refrain from transmitting the in-synchronization indication or the out-of-synchronization indication based on the reference signal when the difference is outside the change threshold. This enables the UE to address situations in which the base station might refrain from transmitting the RS.

Figure 10:
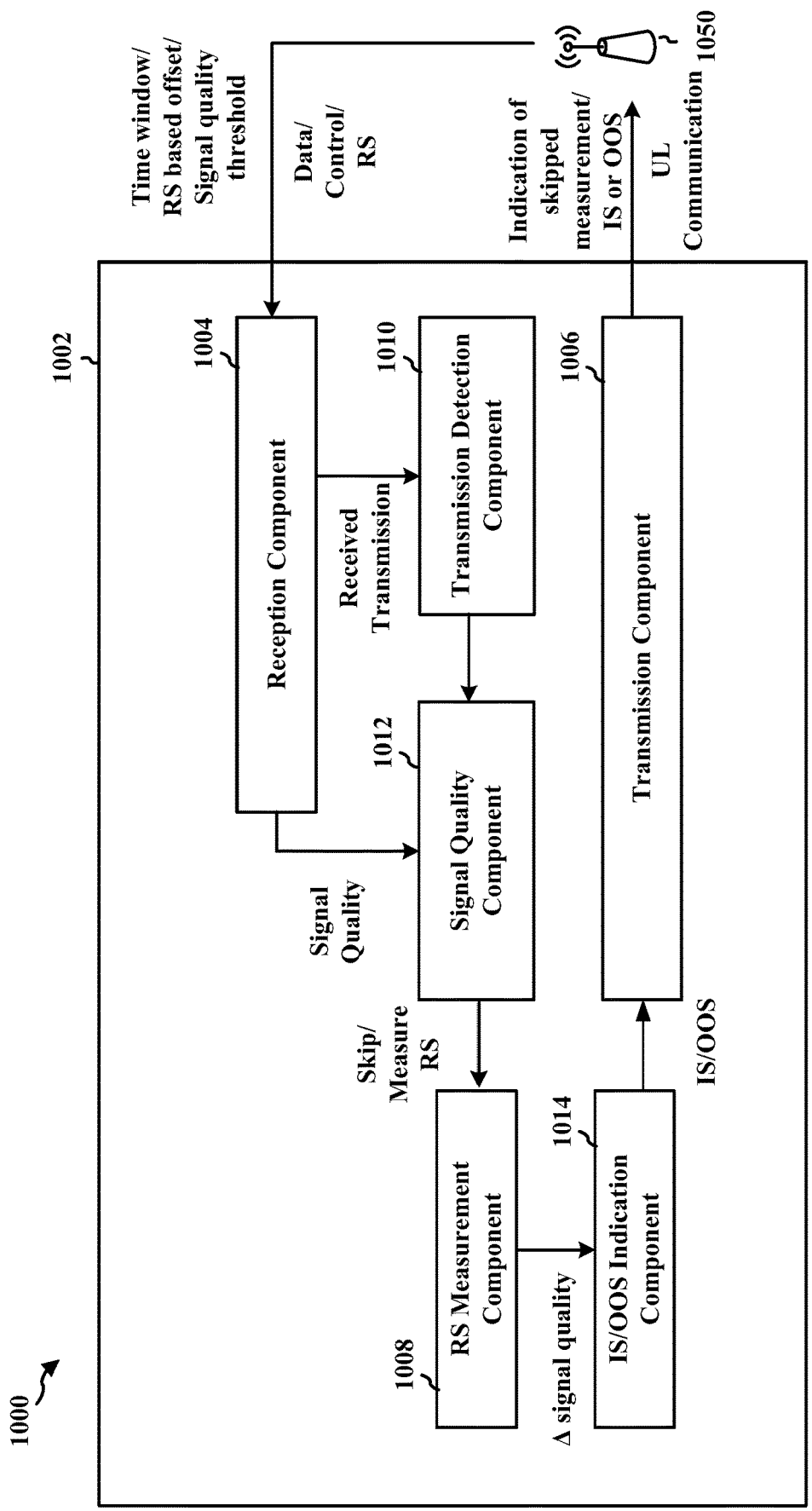
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be UE (e.g., UE 104, 350, 404, 502) communicating with base station 1050 (e.g., base station 180, 310, 402, 504) using multi-beam operation. The apparatus includes a reception component 1004 that receives DL communication from base station 1050 and a transmission component 1006 that transmits UL communication to base station 1050.

The apparatus includes an RS component 1008 that performs measurements of reference signals, a transmission detection component 1010 that determines whether a transmission is received from the base station within a time window, a signal quality component 1012 that determines whether the received transmission has a signal quality that meets a threshold. When a transmission is detected within the time window that meets the signal quality threshold, an indication may be provided to the RS measurement component 1008 to skip measurement of a second reference signal. The apparatus may also include an IS/OOS component 1014 configured to determine whether to transmit an IS/OOS indication using a reference signal measurement based on whether a difference between a first signal quality of the first reference signal and a second signal quality of the second reference signal meets a change threshold.

The apparatus may include additional components that perform each of the blocks of the algorithm in the aforementioned flowcharts of FIGS. 5-9. As such, each block in the aforementioned flowcharts of FIGS. 5-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
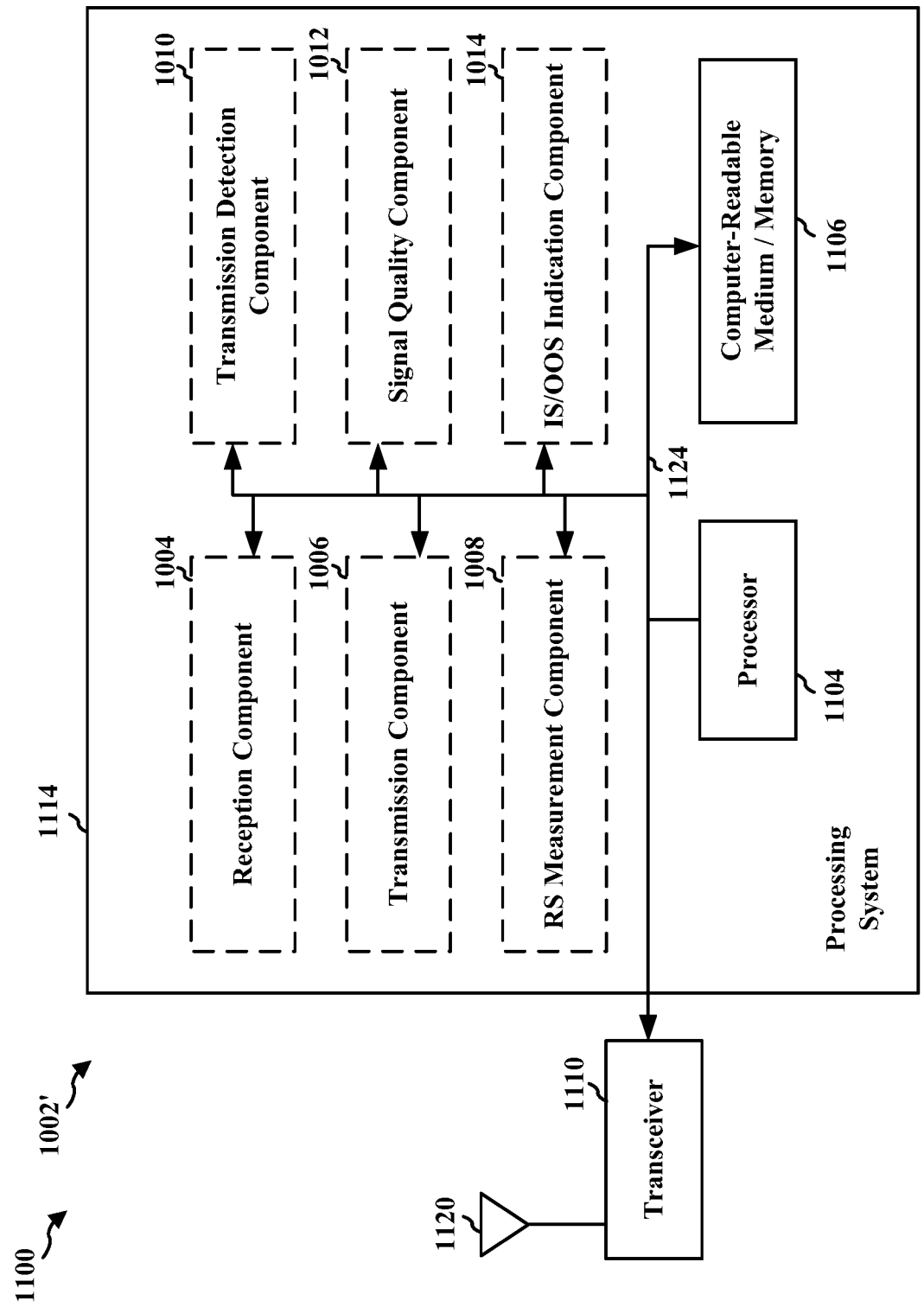
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for performing a measurement of a first reference signal from a base station; means for determining whether a transmission is received from the base station within a time window; means for skipping measurement of a second reference signal, when the transmission is received from the base station within the time window; means for entering a sleep mode or remaining in a sleep mode; means for mapping a signal quality from the first reference signal to the second reference signal based on a reference signal based offset; means for measuring the reference signal; means for transmitting an in-synchronization indication or an out-of-synchronization indication based on a measurement within the time window; means for transmitting an indication to the base station of the skipped measurement of the second reference signal; means for determining whether a difference between a first signal quality of the first reference signal and a second signal quality of the second reference signal meets a change threshold; means for transmitting an in-synchronization indication or an out-of-synchronization indication based on the second reference signal when the difference is within the change threshold; means for refraining from transmitting the in-synchronization indication or the out-of-synchronization indication based on the second reference signal when the difference is outside the change threshold; and means for receiving an indication from the base station for at least one of the time window, a reference signal based offset to the user equipment, and a signal quality threshold. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
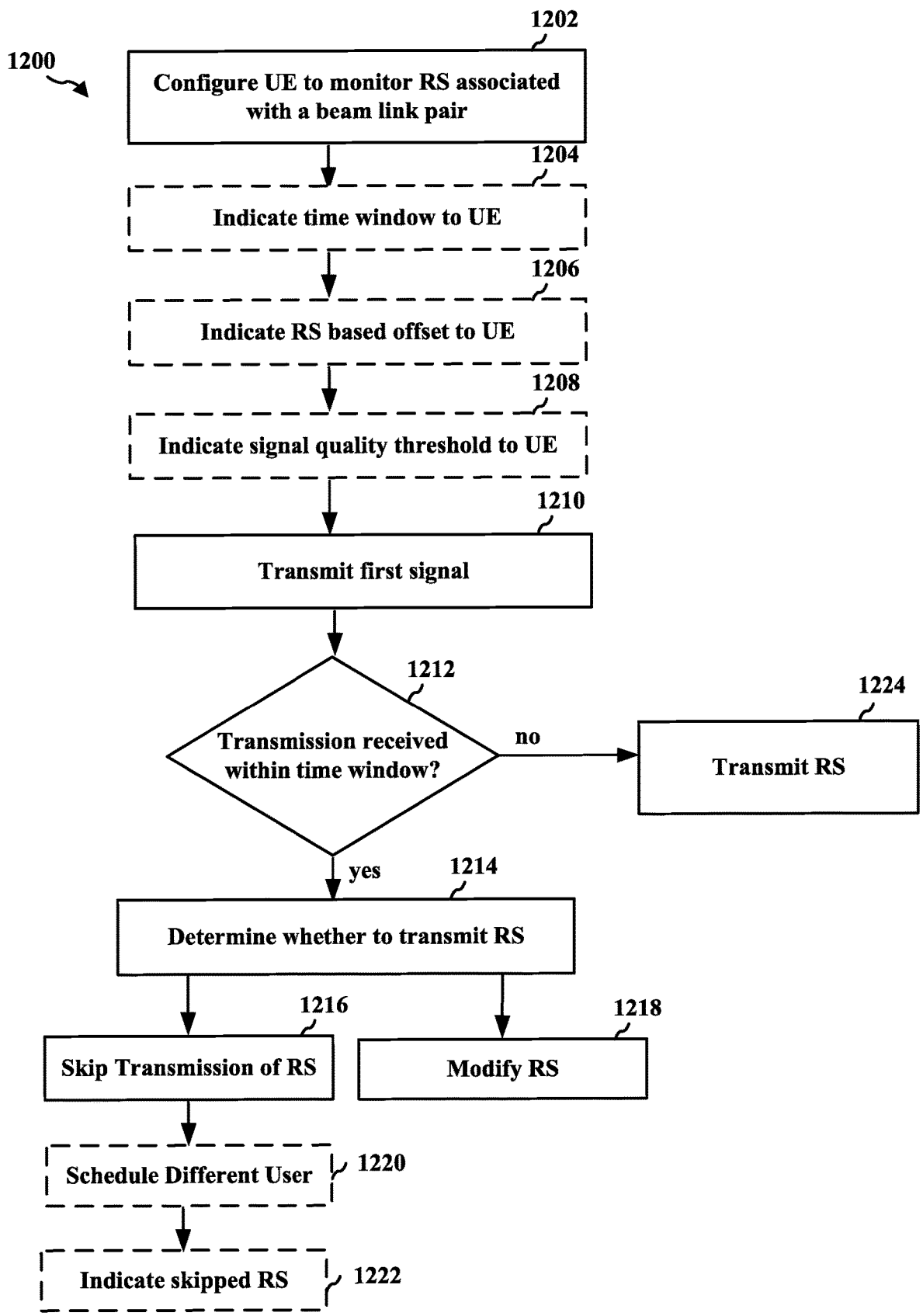
FIG. 12 is a flowchart of a method of wireless communication.

FIG. 12 is a flowchart 1200 of a method of wireless communication. The method may be performed by a base station (e.g., the base station 180, 310, 402, 504, 1050, the apparatus 1302, 1302') using multi-beam wireless communication to communicate with a UE (e.g., UE 104, 350, 404, 502, 1350, the apparatus 1002, 1002'). Optional aspects are illustrated with a dashed line.

At 1202, the base station configures a UE to monitor one or more reference signals associated with a beam pair link. For example, the base station may notify the UE to monitor one or more reference signals, e.g., for RLM, beam recovery, or beam management. The base station may indicate an RS configuration that indicates a number of antenna ports, an RS signal configuration in time and frequency, a sub-frame configuration, etc., as described in connection with 506 in FIG. 5.

The UE may indicate a time window to the user equipment at 1204, e.g., as described in connection with 508 in FIGS. 5 and 703 in FIGS. 7A-7C. The time window may be indicated for a unit based on at least one of a slot, a symbol, or a SFN. The UE may indicate a reference signal based offset to the user equipment at 1206, e.g., as described in connection with 510 in FIG. 5. The UE may indicate a threshold for a signal quality to the user equipment at 1208, e.g., as described in connection with 512 in FIG. 5.

At 1210, the base station transmits a first signal in a transmission to the UE. The signal may comprise any measurable transmission, e.g., a reference signal transmission, a data transmission, or a control transmission. At 1212, the base station determines whether the transmission is received at a user equipment within a time window. The determination may be based on whether the base station receives a transmission from the UE within the time window, e.g., a control transmission, a data transmission, a reference signal transmission, etc. For example, when the base station receives PUCCH, PUSCH, SRS, or ACK/NACK from the UE within the time window, the base station may determine that the UE received the transmission from the base station.

At 1214, the base station determines whether to transmit a reference signal based on whether the transmission is received at the user equipment within the time window. FIGS. 6A, 6B, and 6C illustrate examples of a time window 603 and possible results of the determination by the base station.

Upon determining that the transmission was received at the user equipment, the base station may skip transmission of the reference signal at 1216 or may modify the reference signal at 1218. FIG. 6A illustrates an example in which the base station skips or modifies transmission of the reference signal over a period of time following the determination. In FIG. 6A, the base station determines to skip/modify the reference signal during a period n to n+time period. For example, the base station may modify at least one of a time, a frequency, a power, or a reference signal offset for the reference signal during this period following the determination. Once the period ends, the base station may need to make further determinations regarding whether a transmission has been received by the UE in order to determine whether to transmit an RS during a later period in time.

Upon determining that the transmission was received at the user equipment, the base station may schedule a different user equipment, at 1220, in place of transmitting the reference signal.

Upon determining that the transmission was received at the user equipment, the base station may indicate, at 1222, to the user equipment that the reference signal is skipped.

When the base station determines that the transmission is not received at a user equipment within a time window, the base station transmits the reference signal at 1224. FIGS. 6B and 6C illustrate examples in which the base station may determine to transmit the reference signal.

Figure 13:
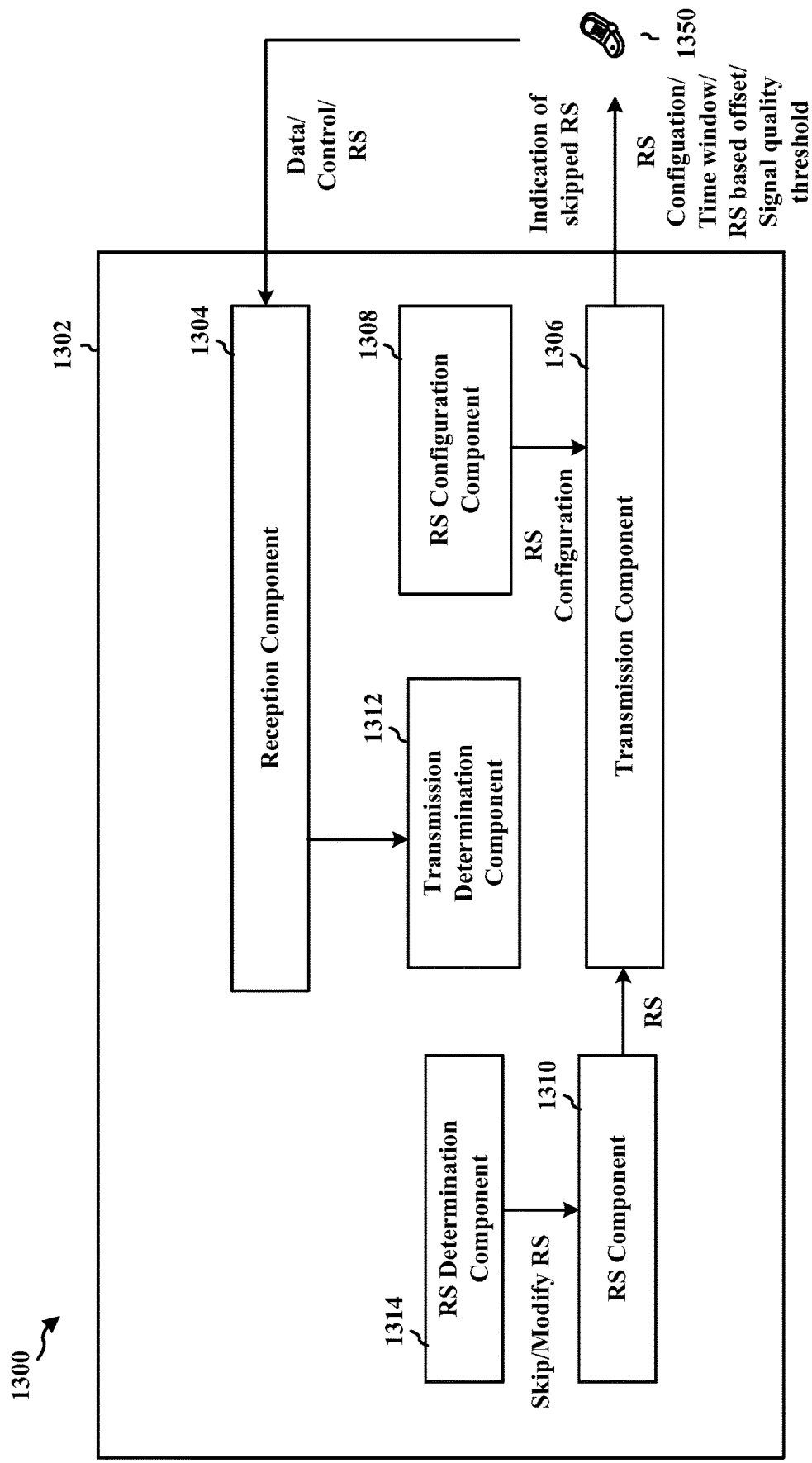
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a base station (e.g., the base station 180, 310, 402, 504, 1050) communicating with UE 1350 using multi-beam operation. The apparatus includes a reception component 1304 that receives UL communication from UE 1350 and a transmission component 1306 that transmits DL communication, including reference signals, to UE 1350. The apparatus includes a reference signal configuration component 1308 configured to configure a UE to monitor one or more reference signals associated with a beam pair link, and which may indicate any of a timing window, a reference signal based offset, or a signal quality threshold to the UE. The apparatus includes a reference signal component 1310 configured to transmit a first reference signal in a transmission to the UE and a transmission determination component 1312 configured to determine whether the transmission is received at a user equipment within a time window. For example, the transmission determination component 1312 may determine whether a first signal transmission was received by the UE based upon receiving at least one of a control channel, a data channel, a sounding reference signal, and an acknowledgement from the user equipment having a signal quality that meets a threshold within the time window.

The apparatus may include a RS determination component 1314 configured to determine whether to transmit a reference signal, based on whether the transmission is received at the user equipment within the time window. The RS determination component 1314 may determine to skip and/or modify the RS transmission, as described in connection with FIG. 12.

The apparatus may include additional components that perform each of the blocks of the algorithm in the aforementioned flowcharts of FIGS. 5-7 and 12. As such, each block in the aforementioned flowcharts of FIGS. 5-7 and 12. may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
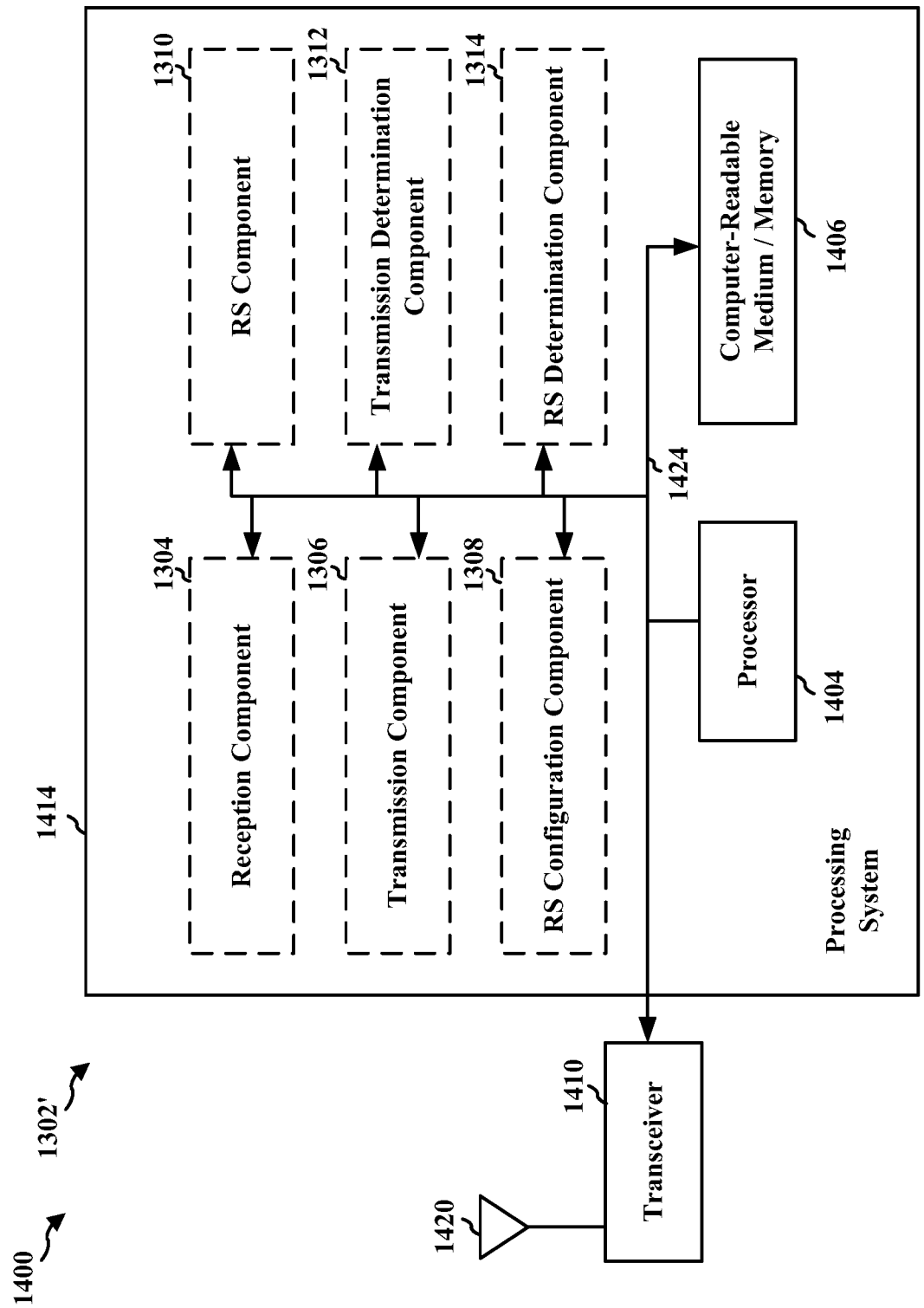
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375.

In one configuration, the apparatus 1302/1302' for wireless communication includes means for configuring a UE to monitor one or more reference signals associated with a beam pair link; means for means for transmitting a first signal in a transmission to the UE; means for determining whether the transmission is received at a user equipment within a time window; means for determining whether to transmit a reference signal, based on whether the transmission is received at the user equipment within the time window; means for skipping transmission of the reference signal; means for modifying at least one of a time, a frequency, a power, or a reference signal offset for the reference signal; means for scheduling a different user equipment in place of transmitting the reference signal; means for indicating to the user equipment that the reference signal is skipped; means for indicating the time window to the user equipment, wherein the time window is indicated for a unit based on at least one of a slot, a symbol, or a SFN; and means for indicating a reference signal based offset to the user equipment; and means for indicating a threshold for a signal quality to the user equipment. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
    configuring a user equipment (UE) to monitor one or more reference signals associated with a beam pair link;
    transmitting a first signal in a downlink transmission to the UE;
    determining, by the base station, whether the downlink transmission is received at the UE, based on whether the base station receives an uplink transmission from the UE within a time window;
    skipping transmission of a reference signal, based on whether the downlink transmission is determined to be received at the UE within the time window, and
    scheduling, upon determining that the downlink transmission was received at the UE, a different UE in place of transmitting the reference signal.

2. The method of claim 1, wherein upon determining that the downlink transmission was received at the UE, the method further comprising:
indicating to the UE that the reference signal is skipped.

3. The method of claim 1, wherein the base station determines that the downlink transmission is received at the UE upon receiving at least one of a control channel, a data channel, a sounding reference signal, or an acknowledgement from the UE having a signal quality that meets a threshold within the time window.

4. The method of claim 3, wherein, when the base station determines that the downlink transmission is not received at the UE within the time window, the base station transmits the reference signal.

5. The method of claim 1, further comprising:
indicating the time window to the UE, wherein the time window is indicated for a unit based on at least one of a slot, a symbol, or a system frame number (SFN).

6. The method of claim 1, further comprising:
indicating a reference signal based offset between a signal quality of the reference signal and another reference signal to the UE.

7. The method of claim 1, further comprising:
indicating a threshold for a signal quality to the UE.

8. An apparatus for wireless communication at a base station, comprising:
means for configuring a user equipment (UE) to monitor one or more reference signals associated with a beam pair link;
means for transmitting a first signal in a downlink transmission to the UE;
means for determining whether the downlink transmission is received at the UE, based on whether the base station receives an uplink transmission from the UE within a time window;
means for skipping transmission of a reference signal, based on whether the downlink transmission is received at the UE within the time window, and
means for scheduling, upon determining that the downlink transmission was received at the UE, a different UE in place of transmitting the reference signal.

9. The apparatus of claim 8, further comprising:
means for indicating to the UE that the reference signal is skipped upon determining that the downlink transmission was received at the UE.

10. The apparatus of claim 8, further comprising:
means for indicating to the UE at least one of:
the time window, wherein the time window is indicated for a unit based on at least one of a slot, a symbol, or a system frame number (SFN);
a reference signal based offset; or
a threshold for a signal quality.

11. An apparatus for wireless communication at a base station, comprising:
a memory; and
at least one processor coupled with the memory and configured to:
configure a user equipment (UE) to monitor one or more reference signals associated with a beam pair link;
transmit a first signal in a downlink transmission to the UE;
determine whether the downlink transmission is received at the UE, based on whether the base station receives an uplink transmission from the UE within a time window;
skip transmission of a reference signal, based on whether the downlink transmission is received at the UE within the time window, and
schedule, upon determining that the downlink transmission was received at the UE, a different UE in place of transmitting the reference signal.

12. The apparatus of claim 11, wherein the at least one processor is further configured to:
indicate to the UE that the reference signal is skipped upon determining that the downlink transmission was received at the UE.

13. The apparatus of claim 11, wherein the at least one processor is further configured to indicate to the UE the time window, wherein the time window is indicated for a unit based on at least one of a slot, a symbol, or a system frame number (SFN).

14. The apparatus of claim 11, wherein the at least one processor is further configured to indicate to the UE a reference signal based offset between a signal quality of the reference signal and another reference signal.

15. The apparatus of claim 11, wherein the at least one processor is further configured to indicate to the UE a threshold for a signal quality.

16. A non-transitory computer-readable medium storing computer executable code for wireless communication at a base station, comprising code to:
configure a user equipment (UE) to monitor one or more reference signals associated with a beam pair link;
transmit a first signal in a downlink transmission to the UE;
determine whether the downlink transmission is received at the UE, based on whether the base station receives an uplink transmission from the UE within a time window;
skip transmission of a reference signal, based on whether the downlink transmission is received at the UE within the time window, and
schedule, upon determining that the downlink transmission was received at the UE, a different UE in place of transmitting the reference signal.

17. The non-transitory computer-readable medium of claim 16, further comprising code to:
indicate to the UE that the reference signal is skipped upon determining that the downlink transmission was received at the UE.

18. The non-transitory computer-readable medium of claim 16, further code to indicate to the UE at least one of:
the time window, wherein the time window is indicated for a unit based on at least one of a slot, a symbol, or a system frame number (SFN);
a reference signal based offset; or
a threshold for a signal quality.

* * * * *